Jan. 9, 1923.
O. TRAMPUSCH.
PNEUMATIC TUBE FOR THE TIRES OF VEHICLE WHEELS.
FILED DEC. 30, 1921.
1,441,461
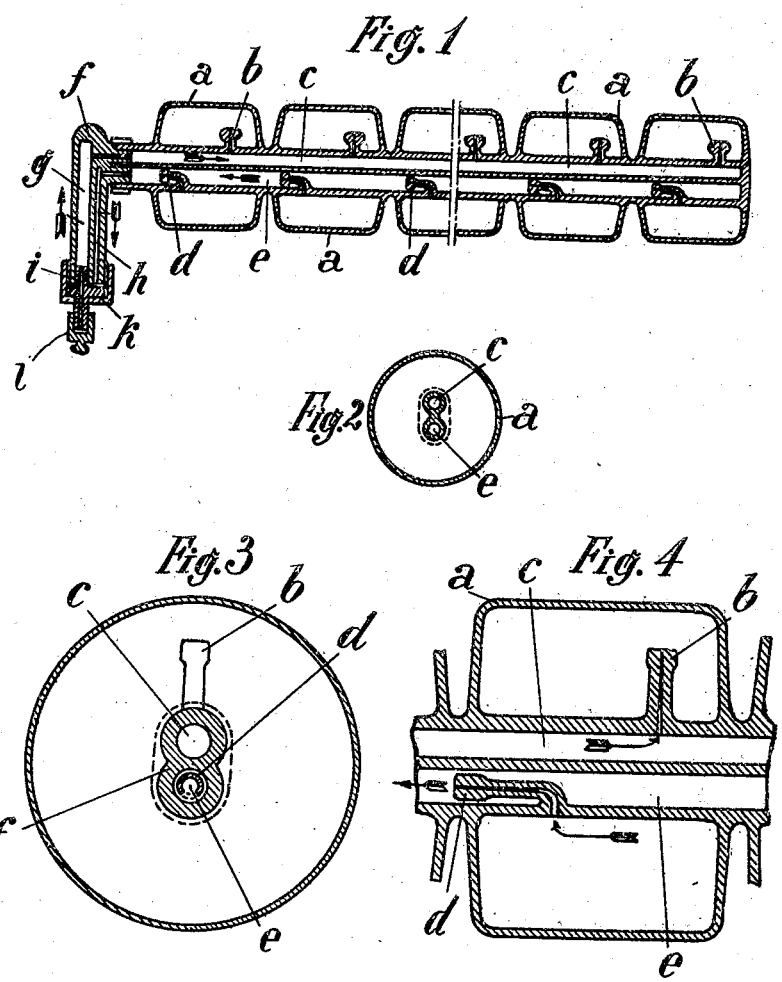
INVENTOR:
Otto Trampusch
By (signature)
his Attorney.

Patented Jan. 9, 1923.

1,441,461

UNITED STATES PATENT OFFICE.

OTTO TRAMPUSCH, OF AUGSBURG, GERMANY.

PNEUMATIC TUBE FOR THE TIRES OF VEHICLE WHEELS.

Application filed December 30, 1921. Serial No. 525,920.

*To all whom it may concern:*

Be it known that I, OTTO TRAMPUSCH, citizen of the Republic of Czecho-Slovakia, residing at Augsburg, Germany, have invented certain new and useful Improvements in Pneumatic Tubes for the Tires of Vehicle Wheels, of which the following is a specification.

The present invention relates to pneumatic tubes for the tires of vehicle wheels, and consists essentially of a series of juxtaposed cells or chambers each of which is connected by non-return valves with inflation and deflation conduits.

By means of my invention the several cells of the tube may be simultaneously inflated or deflated, while in case of injury to or puncture of any cell, the remaining cells remain intact and (if inflated) tend to occupy the space theretofore occupied by the injured cell. As a consequence, even though one or more cells be deflated, the tire containing the tube may be used for a considerable period of time without the need of repairing or changing tubes.

The preferred embodiment of the invention is illustratively exemplified in the accompanying drawing, in which—

Figure 1 is a longitudinal sectional view of my improved inner tube,

Figure 2 is a cross section thereof,

Figure 3 is an enlarged cross section through an individual cell, and

Figure 4 is an enlarged longitudinal section through an individual cell.

The pneumatic tube consists of a series of adjacent cells or chambers $a$, preferably cylindrical in form, each cell being in communication by means of a non-return valve $b$ with the inflation conduit $c$ and by means of a second non-return valve $d$ with the deflation conduit $e$. The two conduits $c$ and $e$ traverse the cells $a$ axially and are connected at one end by a valve body $f$, the deflation conduit $c$ terminating in the passage $g$ in said valve body and the deflation conduit $e$ terminating in the passage $h$ in said valve body. The passage $g$ may be closed by a valve plug $i$ and the passage $h$ may be closed by a screw cap $k$.

The non-return valves $b$ and $d$ may be of any desired form, but preferably consist of flexible nipples connected respectively with the conduits $c$ and $e$, said nipples having passages therethrough which are constricted at the outlet ends so that the ends of the nipples may be pressed together and the outlets automatically closed by the pressure prevailing in the space where the nipples terminate.

The cells may be formed from a continuous tube which is divided into sections and the parts vulcanized to the inflation and deflation ducts. The latter may be constructed, as shown in the drawing, of a double conduit having an inner dividing wall or it may be formed by winding a strip of rubber into S shape and vulcanizing the ends thereto.

The device is operated as follows:—

By removing the cap $l$ from the plug $i$ and applying an air pump to the plug, air may be pumped into the passage $g$ and forced through the inflation conduit $c$ and the valves $b$ into the chambers $a$, filling the latter with air under pressure. It will be understood that the air pressure is sufficient to distend nipples $b$ so as to permit free flow of the air into the cells $a$. Air flows from the chambers or cells $a$ through the valves $d$ and the deflation conduit $e$ and duct $h$ until uniform pressure prevails throughout the entire structure. As soon as the tube has been sufficiently inflated the passage $g$ is placed in communication with atmosphere whereby the inflation conduit is also under atmospheric pressure. As a result of the relatively high pressure in the cells $a$ the non-return valves $b$ close automatically because the very fine openings in the valves are pressed together by the pressure prevailing in the cells. If any of the cells $a$ is injured or punctured the air escapes therefrom and the adjacent cells have the tendency to fill the space which was theretofore occupied by the deflated cell. Compressed air cannot escape from the uninjured cells or from the inflation or deflation conduits because the inflation conduit is under atmospheric pressure while in the deflation conduit high pressure prevails which keeps the non-return valves $d$ closed.

If the tube is to be deflated the valve plug $i$ is removed thus establishing atmospheric pressure in the deflation conduit $e$ through the passage $h$ and the air may then escape from the individual cells through the deflation valves $d$.

I claim:—

A pneumatic tube of the character described, comprising a plurality of individual inflatable cells, a tube traversing said cells axially, a partition in said tube dividing the same into an inflation conduit and a deflation conduit extending parallel to each other, and valves in the walls of said conduits controlling communication between said cells and said conduits, each of said valves having a passage therethrough constricted at its outlet end whereby excess pressure in the space into which said outlet end extends will compress the valve and automatically close the outlet end thereof.

In testimony whereof I affix my signature.

OTTO TRAMPUSCH.

Witnesses:
MARC SMITH,
PAUL DEY.